United States Patent [19]

Mulraney

[11] 3,984,513

[45] Oct. 5, 1976

[54] CONTINUOUS INJECTION-BLOW MOLDING METHOD

[76] Inventor: David T. Mulraney, 502 Hamilton Drive, Hackettstown, N.J. 07840

[22] Filed: Feb. 13, 1975

[21] Appl. No.: 549,544

[52] U.S. Cl. .......................... 264/97; 425/DIG. 209; 425/DIG. 211
[51] Int. Cl.$^2$ ............................................. B29C 17/07
[58] Field of Search .................. 264/89, 94, 96, 97, 264/328, 329; 425/242 B, 324 B, 342, DIG. 209, DIG. 211

[56] References Cited
UNITED STATES PATENTS
3,881,855   5/1975   Farkas ...................... 425/DIG. 209

*Primary Examiner*—Jan H. Silbaugh

[57] ABSTRACT

The novel method comprises sequential and repetitive steps in which a series of core rods are moved into parison molds, plastic is injected into the molds to form a sheath of plastic about the rods, the plastic-sheathed rods are transferred to blow molds, and pneumatic means close onto the blow molds to cause the parison sheaths to conform to the configuration of the blow molds. Follow this sequence of steps, both the core rod and the blow-formed product are removed from the blow mold; the core rod is re-cycled for a repetition of process, and the product is placed into storage or supply. Too, re-supplies of plastic are timely introduced during the process sequence following the injection use of a last provisioned supply or charge, in order that the cycling might proceed without halt.

8 Claims, 1 Drawing Figure

U.S. Patent  Oct. 5, 1976  3,984,513
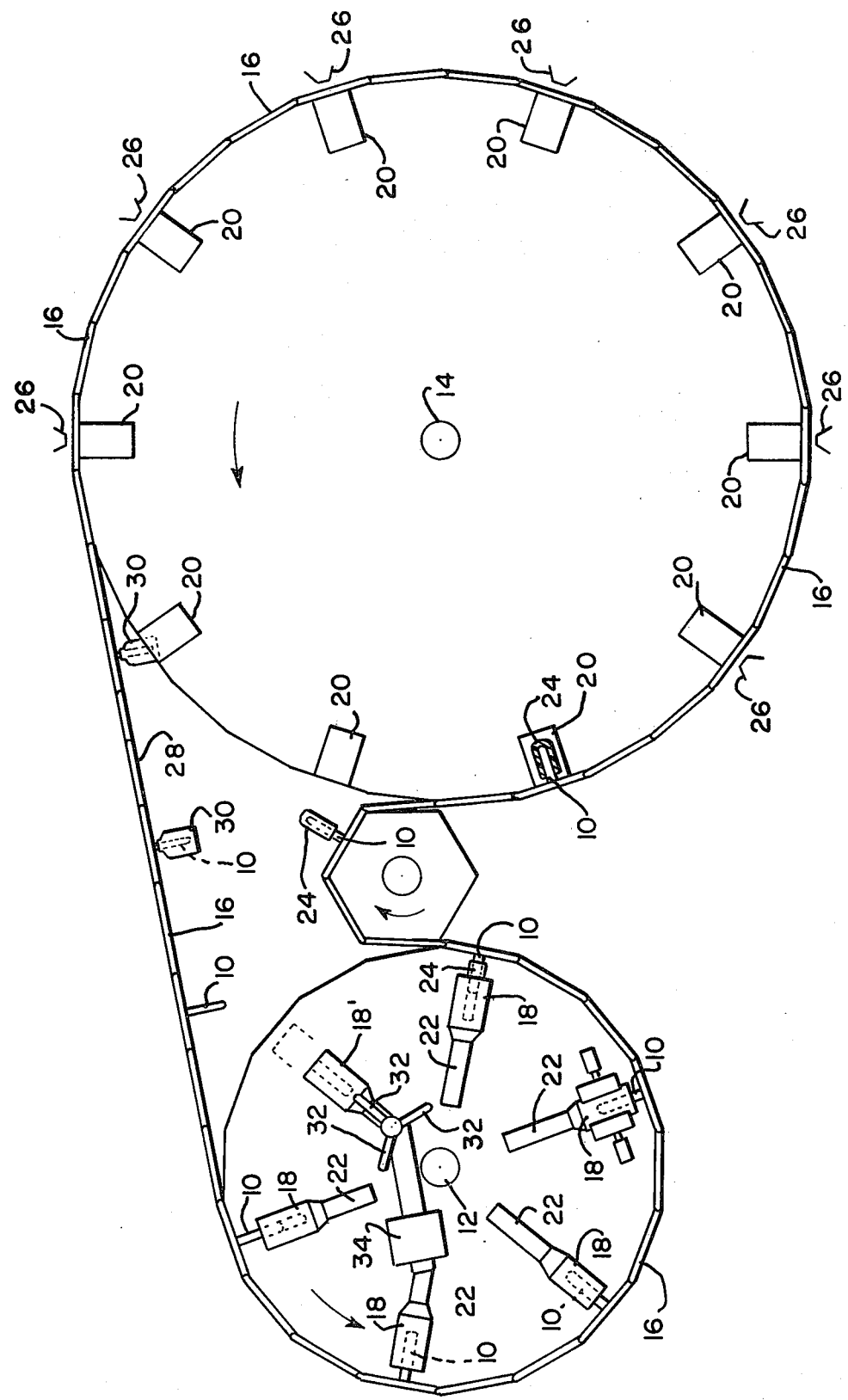

CONTINUOUS INJECTION-BLOW MOLDING METHOD

This invention pertains to plastic injection and blow-molding processes, and in particular to such processes or methods which facilitate a continuous or re-cycling operation.

While a particular structure which will enable the practice of the inventive method is immaterial to disclosure, it may be helpful to note that injection cylinders, extruders, and pneumatic mold blowers, all of such being well known to those skilled in this art, are contemplated in the method.

It is an object of this invention to set forth an improved method of continuous injection-blow molding.

Particularly, it is an object of this invention to disclose a continuous injection-blow molding method comprising the steps of moveing a plurality of core rods in a closed path; receiving said core rods within parison molds during travel of said rods along a first portion of said path; injecting plastic into said parison molds, and in envelopment of said core rods, while said rods are within said parison molds; transferring said core rods, with the enveloping, injected plastic, to blow molds; moving said core rods, plastic, and blow molds along a second portion of said path; blow-forming the injected, enveloping plastic while the latter, rods, and blow molds travel along said second portion of said path; and removing the blow-formed plastic and core rods from the blow molds.

It is a further object of this invention to set forth the aforedescribed method, including the steps of moving the core rods about two rotary axes, moving the parison molds in a circle about one of the rotary axes, and moving the blow molds in a circle about the other of the rotary axes.

Further objects of this invention, as well as the novel features thereof, will become more apparent by reference to the following description, taken in conjunction with the accompanying FIGURE, the latter being an outline or schematic of an apparatus capable of practicing the novel method.

According to my invention, core rods 10 are rotated about two, parallel, rotary axes 12 and 14, the same being carried perpendicularly by a chain, belt, or like filamentary element 16. As the rods, the same being spaced apart a predetermined distance one from each of the others thereof, move about a first of the axes 12, they are received in parison molds 18, and as they move about the second of the axes 14 they are received in blow molds 20.

In the sequence of steps, the core rods 10 leave the second axis 14, and proceed to move about the first axis 12, whereupon the parison molds 18 are moved radially of the first axis (one mold 18' being shown retracted) therewithin to receive the successive core rods. According to means well known in this field, the mold 18 is closed about the rod 10, and locked in position. Each parison mold has its own associated hydraulic (or equal) plastic injection cylinder and piston 22 coupled thereto, and automatically programmed means cause each cylinder to inject plastic into its associated parison mold 18 while the molds and rods cycle about the first axis 12.

The plastic injection deposits a sheath 24 of plastic about each successive core rod. Next, then, the rods and deposited plastic are transferred for movement about the second axis 14 where the deposited plastic is blow-formed.

The filamentary element 16 carries the rods to the second axis, and it is here where blow molds 20 move in a circle about said second axis. The predetermined spacing of rods 10 is complemented in the spacing between successive circling blow molds 20, whereby each blow mold is appropriately positioned to receive a core rod. Thus, successive rods move into the molds, and pneumatic means 26 — according to classic practice in this field — engage the core rods and blow molds, and blow-form the rod-borne plastic into conformity with the configuration of the blow mold(s).

As the blow molds move in a circle about the second axis, both the core rods and the blow-formed product withdraw from the blow molds, on a tangential line 28, as the blow molds recycle to receive newly-plasticized core rods. The plastic-products 30 are removed from the core rods as they move along the tangential line, and the product-stripped rods 10 then move about the first axis again — to repeat the aforegoing process.

Any means, of course, may be used to re-charge the injection cylinders 22 with plastic following the injection motion thereof. My invention, however, contemplates a plurality of pressurized extruders 32 coupled to a plastic-supply manifold or reservoir 34 and rotatable — where successive extruders would be gyrated about a common axis to bring each, sequentially, into alignment with an upcoming injection cylinder. In this manner, then, one extruder 32 would charge one cylinder, and a next extruder 32 would have gyrated into position to engage and charge the next cylinder, etc.

While I have described by invention in connection with typical apparatus for the practice thereof, it is to be clearly understood that this is done only by way of example and not as a limitation to the scope of the invention as set forth in the appended claims. Clearly, the apparatus employed in the exercise of my novel continuous injection-blow molding method is not germane to the instant disclosure.

I claim:

1. A continuous injection-blow molding method, comprising the steps of:
   moving a plurality of core rods in a closed path;
   receiving said core rods within parison molds during travel of said rods along a first portion of said path;
   injecting plastic into said parison molds, and in envelopment of said core rods, while said rods are within said parison molds;
   transferring said core rods, with the enveloping, injected plastic, to blow molds;
   blow-forming the injected, enveloping plastic while the latter, rods, and blow molds travel along said second portion of said path; and
   removing the blow-formed plastic and core rods from the blow molds; wherein
   said moving step comprises moving said core rods about two rotary axes; and further including
   moving said parison molds in a first circle about one of said two rotary axes; and
   moving said blow molds in a second circle about the other of said two rotary axes.

2. A continuous injection-blow molding method, according to claim 1, wherein:
   said injecting step comprises injecting the plastic while said rods are circularly moved.

3. A continuous injection-blow molding method, according to claim 1, wherein:

said injecting step comprises injecting plastic into the parison molds by means of a powered injection cylinder and piston; and further including charging the injection cylinder with plastic, for subsequent injection, intermediate said injecting and transferring steps.

4. A continuous injection-blow molding method, according to claim 3, wherein:

said charging step comprises charging the injection cylinder by means of a pressurized, plastic extruder.

5. A continuous injection-blow molding method, according to claim 3, wherein:

said charging step comprises charging the injection cylinder by means of a pressurized, plastic extruder, and further includes moving the extruder into engagement with the cylinder.

6. A continuous injection-blow molding method, according to claim 3, wherein:

said injecting step comprises injecting each parison mold by means of its own, discrete powered injection cylinder and piston; and further including moving the injection cylinders and pistons about said one rotary axis; and charging each injection cylinder with plastic by means of a pressurized, plastic extruder, while said injection cylinders and pistons move about said one rotary axis.

7. A continuous injection-blow molding method, according to claim 6, wherein:

said charging step comprises charging said cylinders by means of a plurality of plastic extruders; and including moving a first of said extruders into engagement with a given cylinder, and moving a second of said extruders into engagement with a rotationally-following cylinder.

8. A continuous injection-blow molding method, according to claim 1, further including:

moving said parison molds radially of said one axis, as said core rods commence travel along said first portion of said path, thereby to receive said core rods therewithin.

* * * * *